Oct. 23, 1951 L. J. BOWNE 2,572,104

PRIVATE BRANCH EXCHANGE TELEPHONE SYSTEM

Filed April 29, 1949 2 SHEETS—SHEET 1

INVENTOR
L. J. BOWNE
BY A. F. Kane
ATTORNEY

Oct. 23, 1951 L. J. BOWNE 2,572,104

PRIVATE BRANCH EXCHANGE TELEPHONE SYSTEM

Filed April 29, 1949 2 SHEETS—SHEET 2

INVENTOR
L. J. BOWNE
BY
A. J. Kane
ATTORNEY

Patented Oct. 23, 1951 2,572,104

UNITED STATES PATENT OFFICE 2,572,104

PRIVATE BRANCH EXCHANGE TELEPHONE SYSTEM

Langford J. Bowne, Saugerties, N. Y., assignor to Bell Telephone Laboratories, Incorporated, New York, N. Y., a corporation of New York Application April 29, 1949, Serial No. 90,455

8 Claims. (Cl. 179—42)

Figures 1, 3:
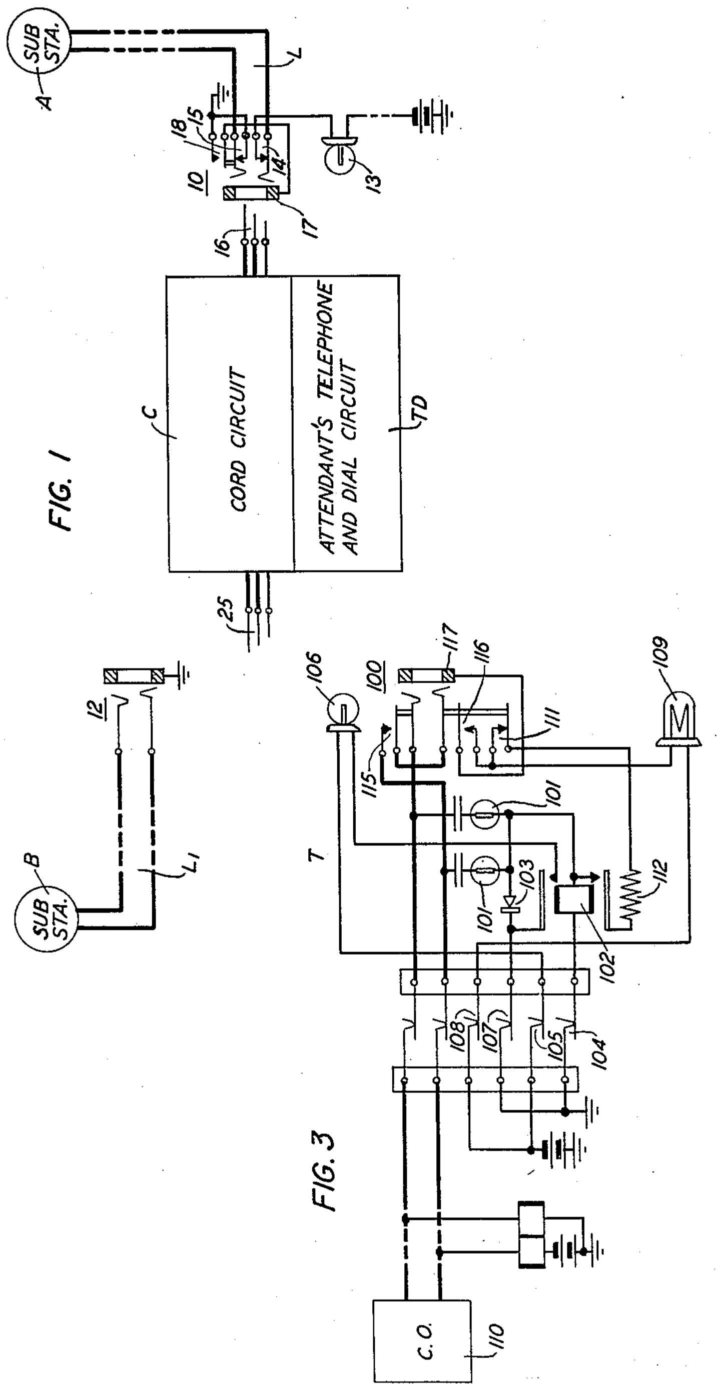

This invention relates to telephone systems and particularly to improvements in circuit instrumentalities employed at private branch exchanges in completing telephone connections between local extension stations, and in rendering local extension lines and trunk lines mutually accessible for the completion or extension of telephone connections between local and remote stations.

It is the object of this invention to simplify and otherwise improve cord circuits and attendant's telephone and dial circuits of the type involved in the extension and completion of telephone connections between extension lines of a private branch exchange and between such lines and trunk lines leading to a central office of either the manual or machine switching type.

A feature of the invention resides in a novel and simplified circuit arrangement for conditioning an attendant's cord for automatic discrimination between inward and outward calls in order to provide non-through supervision on inward calls and through supervision on outward calls. More particularly, a calling supervisory relay in the cord which, on a connection between two local stations, functions under the control of switchhook contacts to effect the display of supervisory lamp signals, also functions under the control of an answering supervisory relay in the cord on a trunk connection to connect to, or preclude the connection to the cord of a holding bridge in accordance with whether the involved trunk call is on an inward or an outward basis.

Another feature of the invention which reduces the time of operation of the attendant's dial circuit and otherwise contributes to its simplicity of design resides in the use of normally closed off-normal contacts of the dial to short-circuit the winding of a local relay which, incident to the movement of the dial from normal position and the consequent separation of the off-normal dial contacts, operates immediately to short-circuit the attendant's receiver and to otherwise condition the attendant's telephone and dial circuit for dialing. Heretofore, dial off-normal contacts were normally open and effected a circuit closure when the dial was moved out of normal position so that the circuit changes resulting from such circuit closure were attained only after the off-normal dial spring traveled the distance necessary to effect the circuit closure. With the arrangement of the present invention this time interval has been eliminated thus introducing a desirable refinement which tends to over-all faster operation.

A further feature of the invention permits splitting the dial circuit when secrecy is desired on a trunk connection while the attendant is talking to the party at a local station. More particularly, when a "talk and dial" key is operated by the attendant, conversations may be had between the attendant and either of the interconnected parties, but if it is desirable that the distant party be excluded from the conversation a splitting key is operated to effectively split the cord and to connect a holding bridge to the trunk end of the cord while maintaining the attendant's telephone circuit connected across the station end of the cord.

These and other features of the invention will be better understood from the following detailed description when read in connection with the accompanying drawings, in which:

Fig. 1 is a circuit schematic showing two local P. B. X lines L and $L_1$ terminating in jacks at the P. B. X and a block C—TD indicated as representing an attendant's cord, and telephone and dial circuits.

Figure 2:
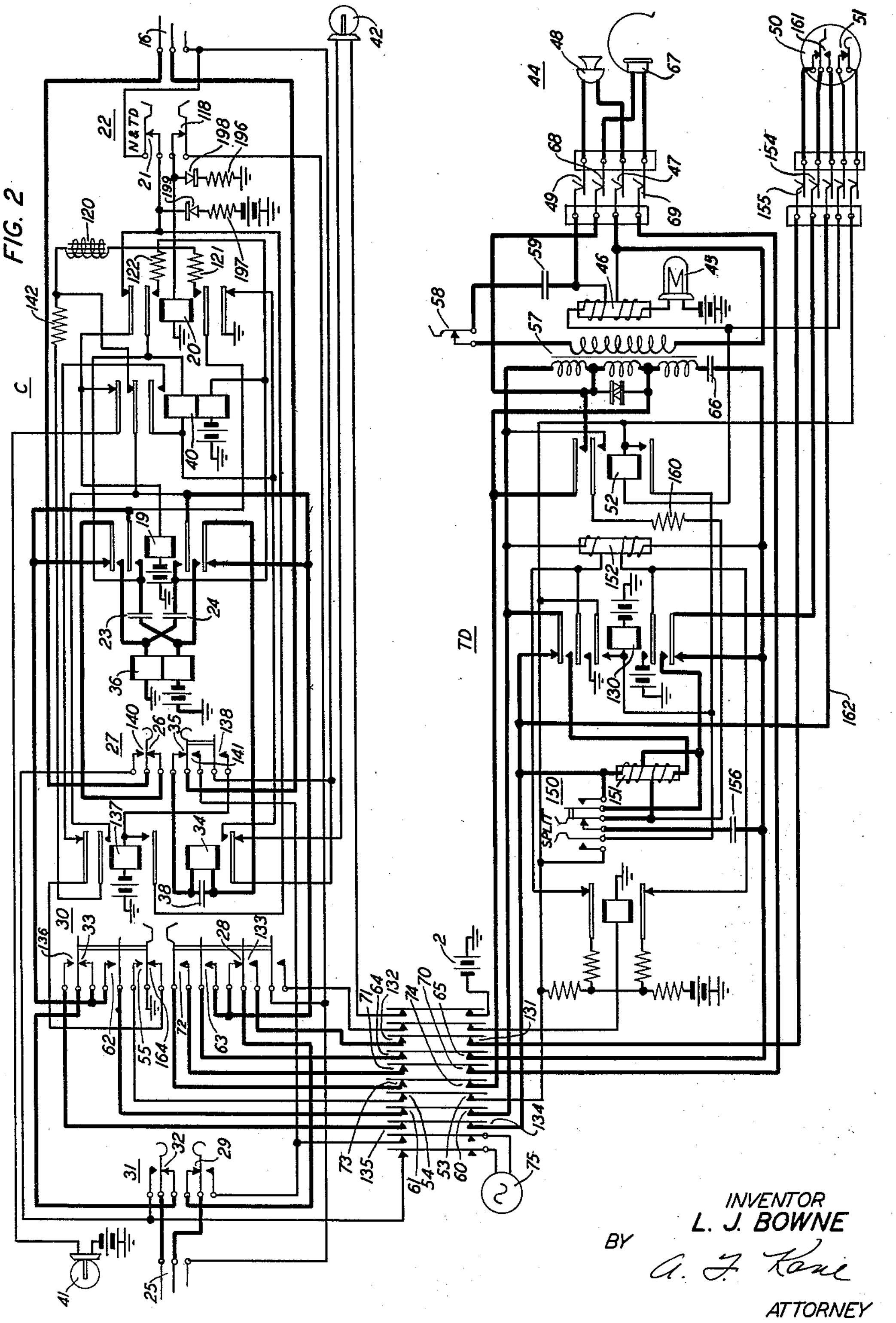

Fig. 2 is a detailed circuit diagram of the cord and attendant's telephone and dial circuits which are indicated schematically at C and TD in Fig. 1; and Fig. 3 is a circuit diagram of a trunk circuit by means of which calls incoming from and directed to a remote exchange may be completed or extended at the P. B. X.

*Local connections*

On a local connection involving stations A and B, Fig. 1, and the corresponding lines L and $L_1$ which terminate at the private branch exchange in jacks 10 and 12, respectively, either station may initiate the call. For descriptive purposes it will be assumed that the subscriber, or party at station A is the calling party and desires to communicate with the party at station B. For simplicity of disclosure jack 12 associated with the line $L_1$ is shown in simplified form.

To originate a call the party at station A removes the telephone from its support which closes the station, or line loop in well-known manner. Incident to this operation by the calling party line lamp 13 is lighted as a call signal in a circuit which may be traced from grounded battery, through the filament of lamp 13, normal contacts 14 of jack 10, over the closed line loop including the tip and ring conductors of line L and the closed switchhook contacts at station A, jack contacts 15 to ground. If desirable an audible signal, such as a buzzer may be included in circuit with the line lamp to supplement the visual signal with an audible signal.

Upon noting the lighted line lamp 13 the private branch exchange attendant inserts the right, or station plug 16 of the cord circuit C into jack 10 corresponding to the lamp 13 whereupon jack contacts 14 and 15 are opened causing lamp 13 to be extinguished and ground potential to be connected to the sleeve 17 of jack 10 by way of the auxiliary jack contact 18.

The cord circuit C (Fig. 2) is normally dry, that is, there is no battery and ground connected to the tip and ring conductors thereof until the right cord plug 16 is inserted in the station jack. With plug 16 in jack 10, sleeve relay 19 of the cord operates in a circuit which may be traced from grounded battery, over the winding of sleeve relay 19, outer upper armature and back contact of relay 20, normal contacts 21 of the "night and through dial" key 22, sleeve contact of plug 16, sleeve 17 of jack 10, jack contacts 18 to ground.

At its back contacts and outer upper and lower armatures relay 19 splits the cord. The right and left plugs 16 and 25 are now interconnected by way of condensers 23 and 24, one circuit being traced from the tip contact of plug 16, and contacts 26 of "ring right" key 27, outer upper armature and front contact of relay 19, condenser 24, front contact and inner lower armature of relay 19, contacts 28 of "talk and dial" key 30, contacts 29 of "ring left" key 31, to the ring contact of plug 25, and the other circuit being traced from the tip contact of plug 25, contacts 32 of key 31, contacts 33 of key 30, inner upper armature and front contact of relay 19, condenser 23, front contact and outer lower armature of relay 19, condenser 38 and the parallelly-connected winding of "answering supervisory" relay 34, contacts 35 of key 27, to the ring contact of plug 16.

Talking battery and ground through the lower and upper windings of relay 36 are now connected to the right, or "station" end of the cord by way of the front contacts and outer lower and upper armatures of relay 19, the winding of "answering supervisory" relay 34 and the contacts 26 and 35 of key 27.

Battery and ground are also connected to the left or "trunk and station" end of the cord through the windings of "calling supervisory" relay 40. This connection may be traced from grounded battery, lower winding of relay 40, front contact and inner lower armature of relay 19, contacts 28 of key 30, contacts 29 of key 31, to the ring contact of plug 25, and from the tip contact of plug 25, contacts 32 of key 31, contacts 33 of key 30, inner upper armature and front contact of relay 19, upper winding of relay 40, back contact and outer lower armature of relay 20, to ground.

The battery and ground connection is reversed at condensers 23 and 24 to improve transmission by reducing crosstalk which may leak through relays 36 and 40. The circuit through relay 36 is reversed relative to that through relay 40 to further reduce the possibility of crosstalk between adjacent cord circuits.

When the plug 16 was inserted into jack 10 of the calling line L, the same ground which caused relay 19 to operate causes the lighting of lamp 41 associated with the "trunk" end of the cord. The circuit in which lamp 41 is lighted is obvious. Lamp 42 associated with plug 16 does not light at this time because its energizing circuit is open at the back contact of relay 34, which relay is now operated over the closed station loop including the line conductors of line L.

After the insertion of plug 16 into jack 10 the attendant actuates the "talk and dial" key 30 to connect her telephone set 44 across the cord in order to communicate with the calling party at station A. With key 30 operated, talking battery for the attendant's transmitter is supplied over a circuit extending from grounded battery, over the filament of resistance lamp 45, lower winding of retardation coil 46, connector contacts 47, transmitter 48, connector contacts 49, upper winding of retardation coil 46, lower off-normal contacts 51 of dial 50, which contacts normally short-circuit the winding of "off normal" relay 52, connector contacts 53 and 54, contacts 55 of key 30 to ground.

It will be observed that the attendant's transmitter 48 is connected also across the primary, or right winding of induction coil 57 by way of the monitoring key 58 and condenser 59 so that any speech activation of the transmitter 48 (with key 58 in its normal unoperated position) sets up corresponding speech frequency signals in the primary of coil 57 which are induced in the secondary winding of the coil for transmission to the calling station A by way of a circuit which may be traced from the upper terminal of the secondary winding of coil 57, connector contacts 60 and 61, contacts 62 of key 30, inner upper armature and front contact of relay 19, condenser 23, front contact and outer lower armature of relay 19, condenser 38 and winding of answering supervisory relay 34 in parallel, contacts 35 of key 27, ring contact of plug 16, ring contact of jack 10, closed line loop at station A by way of the line conductors of line L, tip contact of jack 10, tip contact of plug 16, contacts 26 of key 27, outer upper armature and front contact of relay 19, condenser 24, front contact and inner lower armature of relay 19, contacts 63 of key 30, connector contacts 64 and 65, condenser 66, to the lower terminal of the secondary winding of coil 57.

The attendant's receiver 67 is connected directly across the center section of the secondary winding of coil 57 by way of connector contacts 68 on one side and on the other side by connector contacts 69, 70 and 71, contacts 72 of key 30, and connector contacts 73 and 74, so that any speech signals emanating from station A are reproduced in the receiver.

Having connected the telephone set 44 across the cord the P. B. X attendant converses with the calling party at station A and learns that a connection with station B on line $L_1$ is desired. Accordingly, plug 25 of the cord C is inserted into jack 12 (Fig. 1) associated with line $L_1$ on which the called station B is located and the "ring left" key 31 is actuated. With key 31 operated, ringing current source 75 is connected across the tip and ring terminals of plug 25 by way of alternate contacts of the key and associated connected contacts, and current therefrom is projected out over line $L_1$ to energize the audible signaling device, or ringer at the called station B.

When the telephone at the called station B is removed from its support in response to the audible call signal and after the attendant has restored the "ring left" key 31 to normal, "calling supervisory" relay 40 operates. The operating circuit for relay 40 extends from grounded battery, over the lower winding of relay 40, front contact and inner lower armature of relay 19, contacts 28 of key 30, which key may be restored before or after signaling current is projected out over the called line, contacts 29 of key 31, ring contacts of plug 25, ring contacts of jack 12 of the called line $L_1$, over the closed line loop at station B, tip contacts of jack 12, tip contacts of plug 25, contacts 32 of key 31, contacts 33 of key 30, inner upper armature and front contact of relay 19, upper winding of relay 40, to ground at the back contact and outer lower armature of relay 20. At its uppermost armature and back contact relay 40 opens the energizing circuit for lamp 41 causing this lamp to be extinguished. Other armature operations of relay 40 are of no significance at this time.

The calling and called stations A and B are now connected for communication and the parties thereat may converse. The called station is supplied with talking battery by way of the windings of relay 40 whereas battery for the calling station is supplied through the windings of relay 36. The talking path between the interconnected stations is by way of condensers 23 and 24 as hereinbefore indicated.

Either station may recall the attendant by operating the station switchhook. This causes the release and reoperation of the corresponding relay 34 or 40 and the flashing of the corresponding lamp 42 or 41. The attendant answers such signals by operating the "talk and dial" key 30.

At the termination of conversation between the parties at stations A and B the telephones thereat are returned to their supports whereupon the corresponding switchhook contacts are opened causing relays 34 and 40 to release. Lamps 42 and 41 therefor, are lighted as disconnect signals. Cord plugs 16 and 25 are then removed from jacks 10 and 12, respectively, and the circuit restores to normal.

*Trunk connections—incoming*

A trunk circuit T is shown in Fig. 3 terminating at the P. B. X in a jack 100. This circuit is equipped with thermistors 101 in the ring-up relay circuit to provide a time delay and thereby prevent false line signals when central office equipment functions after a connection is taken down at the P. B. X. These elements normally are of extremely high resistance but when ringing current is applied for approximately one-half second or longer the resistance of the thermistor connected to the side of the trunk to which ringing current is connected is reduced materially thus providing an operating circuit for relay 102 from either side of the trunk to ground.

Varistor 103 is provided for two purposes; (1) to provide a low resistance operating path for the thermistor, and (2) to shunt relay 102 on one-half cycle of the ringing current so that the relay will be operated steadily during the ringing period on the other one-half cycle. The varistor 103 is so poled that the operating and locking circuits of relay 102 are aiding.

On an incoming call from a central office indicated at 110 in Fig. 3, ringing current is applied to either or both of the conductors of the trunk T in well-known manner. This current traverses the thermistors 101 and the associated condensers and thence to ground by way of the winding of relay 102 and the shunting varistor 103 and the corresponding connector contacts 104 and 107. Relay 102 is energized on alternate half cycles of this current and operates.

At its upper armature and front contact, relay 102 completes an obvious energizing circuit for lamp 106 which includes the connector contacts 105 and 107. At its lower armature and front contact, relay 102 completes its own locking circuit which may be traced from grounded battery, over connector contact 108, resistance lamp 109, contact 111 of jack 100, resistance 112, lower armature and front contact and winding of relay 102, connector contact 104, to ground.

Upon noting the lighted lamp 106 the P. B. X attendant inserts the left plug 25 of the cord C into the trunk jack corresponding to the lighted lamp. This results in the separation of jack contacts 111 in the locking circuit for relay 102 whereupon this relay releases its armatures and opens the energizing circuit for lamp 106. Lamp 106 accordingly, is extinguished. Auxiliary jack contacts 115 are closed rendering the ring conductor of the trunk continuous to the corresponding jack contact. Auxiliary jack contacts 116 also are closed incident to the insertion of plug 25 into the jack 100 and connect battery through resistance lamp 109 to the sleeve terminal of the jack.

The reason for employing a normally open ring connection between the ring contact of the trunk jack and the corresponding trunk conductor is because outgoing calls require that when the trunk plug is inserted in the jack the ring spring shall be open until the tip spring starts to move to avoid a possible short circuit of the tip and ring springs while the plug is entering the jack. This prevents a false pulse to the central office equipment. When the plug is fully seated in the jack the tip and ring conductors are extended to the cord in the usual manner.

With plug 25 in jack 100, relay 20 operates in a circuit which is traced from grounded battery (Fig. 3), connector contacts 108, filament of resistance lamp 109, auxiliary jack contacts 116, sleeve terminals 117 of jack 100, sleeve terminal of plug 25, contact 118 of "night and through dialing" key 22, winding of relay 20, to ground.

Relay 20, at its inner lower armature and front contact, connects retardation coil 120 and resistance 121 in series across the cord to trip machine ringing and to provide a bridge for holding the central office connection.

At its inner upper armature and front contact, relay 20 connects the windings of "calling supervisory" relay 40 in series with resistance 122 so that relay 40 is used as a local circuit relay under control of the "answering supervisory" relay 34 as will be described more fully hereinafter. At its outer lower armature and back contact, relay 20 disconnects ground potential from the winding of relay 40, and at its outer upper armature and back contact it opens the circuit to sleeve relay 19 to prevent this relay from operating later when the connection is extended to the called stations.

It will be observed that the trunk plug 25 may be inserted in the trunk jack 100 either with the "talk and dial" key 30 operated or released. If the key is unoperated, the bridge including retardation coil 120 and resistance 121 is connected across the connected trunk incident to the operation of relay 20, by way of the back contact and middle armature of relay 40, contacts 28 of key 30, contacts 29 of key 31, to the ring terminal of plug 25, and by way of the front contact and inner lower armature of relay 20, contacts 33 of key 30, contacts 32 of key 31 to the tip terminal of plug 25. If key 30 is operated, contacts 28 and 33 thereof are open and the bridge circuit is completed by way of contacts 63 and 62 of key 30, the circuits from these points including the key contacts 63, connector contacts 64 and 65, back contact and outer lower armature of relay 130, connector contacts 154, dialing contacts of dial 50, connector contacts 155, 131 and 132, contacts 133 of key 30, contacts 29 of key 31 to the ring terminal of plug 25, and the contacts 62 of key 30, connector terminals 61 and 60, outermost upper armature and back contact of relay 130, connector contacts 134 and 135, contacts 136 of key 30, contacts 32 of key 31 to the tip contact of plug 25.

With plug 25 in jack 100 and the "talk and dial" key operated, the P. B. X attendant may converse with the calling party to ascertain with which line a connection is desired.

As hereinbefore described talking battery for the attendant's transmitter 48 is supplied from the battery associated with the resistance lamp 45 and ground at contacts 55 of key 30 by way of the off-normal contacts 51 of dial 50 and connector contacts 53 and 54. Also, the attendant's receiver 67 is connected across the middle section of the secondary winding of induction coil 57 so that the talking path to the trunk T may be traced from the upper terminal of the secondary coil 57, outermost upper armature and back contact of relay 130, connector contacts 134 and 135, contacts 136 of key 30, contacts 32 of key 31 to the tip terminal of plug 25 and out over the tip lead of the established connection to the calling station, back over the corresponding ring lead, ring contact of plug 25, contacts 29 of key 31, contacts 133 of key 30, connector contacts 132 and 131, connector contacts 155, dial contacts of dial 50, outer lower armature and back contact of relay 130, condenser 66, to the lower terminal of induction coil 57.

Assuming the calling party requests that a connection be extended to line L on which station A is located, the attendant inserts the "station" plug 16 into jack 10 which terminates the called line L at the P. B. X, and actuates the "ring right" key 27.

The cord of this invention is arranged for automatic discrimination between inward and outward calls in order to provide "non-through" supervision on inward calls and "through" supervision on outward calls. When "ring right" key 27 is actuated, relay 137 operates in a circuit which includes grounded battery, winding of relay 137, contacts 138 of key 27, sleeve contacts of plug 16 and jack 10 (Fig. 1), jack contacts 18 and ground. Lamp 42, at this time, is lighted in a circuit which may be traced from grounded battery 2, associated connector contacts, filament of lamp 42, back contact and armature of relay 34, and over the now grounded sleeve contacts of plug 16 and jack 10. At its lower armature and front contact, relay 137 completes a locking circuit for itself to ground on the sleeve of plug 16 by way of contacts 21 of the "night and through dialing" key 22.

At is outer upper armature and back contact, relay 137 opens a locking circuit for relay 40 so that the holding bridge will be reconnected to prevent the release of the central office connection at the end of the conversation between the calling and called parties. This provides for the station recalling the P. B. X attendant without releasing the central office equipment. On outward calls relay 137 does not operate because key 27 is not operated, so that at the end of the conversation relay 40, being locked up, as described under "Local connections," the central office equipment will release immediately when the calling station disconnects.

At contacts 140 and 141 of key 27 the ringing current source 75 is connected across the tip and ring conductors of the cord and thence across the corresponding conductors of the called line L. Ringing current from this source therefore is projected over the called line to actuate the audible signal device, or ringer at the called station A.

When the called party answers in the usual manner and the key 27 is restored, relay 34 operates in series with the called station from battery at the central office. At its back contact, relay 34 opens the energizing circuit to lamp 42 causing the lamp to be extinguished. At its front contact, relay 34 completes an operating circuit for relay 40 which may be traced from grounded battery, lower winding of relay 40, resistance 122, front contact and inner upper armature of relay 20, upper winding of relay 40, front contact and armature of relay 34, sleeve contacts of plug 16 and jack 10, jack contacts 18 to ground. Relay 40 operates in this circuit but does not lock since its locking circuit is open at the back contact and outer upper armature of relay 137, which relay, as previously described is locked operated to ground on the sleeve terminal of the called line jack 10.

Relay 40, at its middle armature and back contact, removes a short from resistance 142 thus increasing the resistance of the bridge across the cord, which bridge includes the retardation coil 120 and resistance 121 as previously indicated. This increase in the resistance of the holding bridge is effected when the called station answers so that later, when the station disconnects, there will be no open interval given to the central office while relays 34 and 40 release and reconnect the retardation coil 120 across the cord to hold the central office connection.

With the telephone removed from its support at station A, telephone communication between the calling and called parties may take place. Under this condition the tip conductor of the cord C may be traced from the tip contact of plug 25, over the cord C may be traced from the tip contact of plug 25, over the contacts 32 of key 31, contacts 33 of key 30, back contact and outer upper armature of relay 19, contacts 26 of key 27, and the tip contact of plug 16; the ring conductor may be traced from the ring contact of plug 25, contacts 29 of key 31, contacts 28 of key 30, back contact and outer lower armature of relay 19, condenser 38 and the parallelly connected winding of relay 34, contacts 26 of key 27 to the ring contact of plug 16. Across the tip and ring is connected the high impedance holding bridge which includes retardation coil 120 and resistances 121 and 142. Under this condition talking battery for the called station A is supplied from the central office.

If during the established connection involving the trunk T and the line L the P. B. X attendant desires to speak to the party at the local station A with secrecy, this may be accomplished by the operation of both the "talk and dial" key 30 and the "splitting" key 150 in the attendant's telephone and dial circuit TD. With key 30 operated, contacts 33 and 28 are open thus splitting the cord; at contacts 62 and 63 of key 30 the station end of the cord and the connected station A are connected to the coil 57 in the attendant's telephone circuit thus permitting conversation between the attendant and the party at station A to take place.

At contacts 55 of key 30, ground is extended over connector contacts 54 and 53, over the left alternate contacts of key 150 to battery and ground through the winding of relay 130. Relay 130 operates in this circuit and, at its innermost upper armature and front contact, locks to ground at contacts 55 of key 30 independently of the "splitting" key 150. Talking battery for station A, under this condition, is provided through the upper winding of retardation coil 152. The circuit involving this battery supply may be traced from grounded battery, over the inner lower front contact and armature of relay 130, lower winding of retardation coil 152, connector contacts 65 and 64, contacts 63 of key 30, and thence over the established connection to station A and back to contacts 62 of key 30, connector contacts 61 and 60, upper winding of retardation coil 152, middle upper armature and front contact of relay 130 to ground.

The bridge holding the central office end of the connection may be traced from the tip contact of plug 25, contacts 32 of key 31, contacts 136 of key 30, connector contacts 135 and 134, right alternate contacts of key 150 (these contacts normally short-circuit the upper winding of retardation coil 151) front contact and lower armature of relay 130, dialing contacts of dial 50, connector contacts 155, 131 and 132, contacts 133 of key 30, contacts 29 of key 31, to the ring contact of plug 25. Thus the two ends of the cord are isolated from each other, battery supply and the attendant's telephone circuit are associated with the station end of the cord and the central office end of the connection is held. The attendant may converse with the party at station A without the calling party hearing the conversation.

The attendant may reconnect the station A to the trunk T by restoring the "splitting" key 150. Under this condition, the talking circuit is through retardation coil 151 until the "talk and dial" key 30 is restored. This talking circuit may be traced as follows: the trunk end of the circuit extends from the tip contact of plug 25, contacts 32 of key 31, contacts 136 of key 30, connector contacts 135 and 134, upper winding of retardation coil 151, front contact and outer lower armature of relay 130, connector contacts 154, dialing contacts of dial 50, connector contacts 155, 131 and 132, contacts 133 of key 30, contacts 29 of key 31, to the ring contact of plug 25; the station end of the talking connection may be traced from the tip contact of plug 16, contacts 26 of key 27, outer upper armature and back contact of relay 19, contacts 62 of key 30, connector contacts 61 and 60, outermost upper armature and front contact of relay 130, lower winding of retardation coil 151, condenser 156, connector contacts 65 and 64, contacts 63 of key 30, back contact and outer lower armature of relay 19, winding of relay 34 and parallelly connected condenser 38, contacts 35 of key 27, to the ring contact of plug 16.

When the "talk and dial" key 30 is restored, the talking circuit between the called line L and the trunk T is through cord C, the key contacts 136, 62, 55, 72, 63 and 133 of the key 30 being open thus disassociating the attendant's telephone and dial circuit TD from the cord.

When the party at station A disconnects at the termination of conversation, relay 34 restores its armature causing lamp 42 to be lighted in a circuit which finds ground at contacts 18 of the station jack 10 and battery at 2. Relay 40 releases incident to the release of relay 34 causing resistance 142 to be short-circuited and reconnecting the lower impedance bridge, including retardation coil 120 and resistance 121 across the trunk end of the cord to prevent release of the central office connection. This also permits station A to recall the P. B. X attendant without releasing the central office equipment.

Upon noting the lighted condition of lamp 42, the P. B. X attendant removes the plugs 16 and 25 from the jacks 10 and 100 respectively, to restore the circuits to normal condition. When the plug 16 is withdrawn from jack 10, the locking circuit of relay 137 is opened and this relay releases. When plug 25 is withdrawn from jack 100, the central office connection is released in well-known manner and relay 20 in the cord restores its armatures.

*Trunk connections (outgoing) to dial central office*

Outgoing trunk calls from a local station such as station A are originated at the station in the usual manner and as previously described under "Local connections." Under this condition line lamp 13 is lighted as a call signal and is extinguished when the P. B. X attendant inserts plug 16 into jack 10 associated with lamp 13. Relay 19 operates in a manner previously described to supply battery and ground to the right cord and relay 34 operates over the station loop to prevent the right cord lamp 42 from lighting. When the left plug 25 is inserted in the trunk jack 100, relay 20 operates from battery over the sleeve of the trunk jack. It is understood that prior to the insertion of plug 25 into jack 100, the attendant operated the "talk and dial" key 30 to connect her telephone to the calling station and, learning of the desires of the calling party inserts the plug into the trunk jack.

Relay 20, operated, prepares relay 40 for operation in a local circuit; disconnects ground from the upper winding of relay 40; opens the circuit to relay 19; opens the circuit to the left cord lamp 41; and connects the retardation coil 120 and resistance 121 across the trunk. Relay 19 releases and removes battery and ground from both the right and left cords and connects the tip and ring conductors of the left cord to the tip and ring conductors of the right cord. The calling station A is thus connected to the central office trunk in series with the winding of relay 34.

The attendant dials on outgoing trunk connections such as the one thus far set up, with the "talk and dial" key operated. The dial 50 accordingly is operated in the well-known manner in accordance with the connection desired by the calling party at station A.

It will be noted at this time that the winding of "off normal" relay 52 in the attendant's telephone and dial circuit TD is normally short-circuited by the off-normal contacts 51 of dial 50. Thus when the dial is moved off normal preparatory to dialing the desired number and the off-normal contacts are separated, relay 52 operates in a circuit which may be traced from grounded battery, filament of resistance lamp 45, lower winding of retardation coil 46, connector contacts 47, transmitter 48, connector contacts 49, upper winding of retardation coil 46, winding of relay 52, connector contacts 53 and 54, contacts 55 of key 30 to ground.

At its lower armature and front contact, relay 52 completes an obvious operating circuit for relay 130 which finds ground potential at contacts 55 of key 30. At its outer upper armature and front contact relay 52 short-circuits the attendant's receiver 67 to prevent the attendant hearing clicks on subsequent operation of the dial circuit. At its inner upper armature and front contact relay 52 connects resistance 160 in series with condenser 156 across the station end of the cord circuit. Further movement of the dial off normal closes the off-normal contacts 161 of dial 50 thus short-circuiting the tip and ring conductors of the dial circuit to provide the minimum resistance loop possible to the central office. This circuit may be traced from the tip contact of plug 25, over contacts 32 of key 31, contacts 136 of key 30, connector contacts 135 and 134, conductor 162, contacts 161 and the dialing contacts of dial 50, connector contacts 155, 131 and 132, contacts 133 of key 30, contacts 29 of key 31 to the ring contact of plug 25.

Relay 130, operated, locks to ground at contacts 55 of key 30. At its upper outermost and outer lower armatures and back contacts, relay 130 splits the right end of the dial circuit from the left end leaving the attendant's telephone circuit connected to station A on the right end of the cord. At its outer lower armature and front contact, relay 130 connects the upper winding of retardation coil across the left, or trunk end of the cord. At its outermost armature and front contact, relay 130 bridges the lower winding of retardation coil 151 in series with condenser 156 across the station end of the cord and the induction coil 57. At its middle upper and inner lower armatures and front contacts, relay 130 connects ground and battery through the windings of retardation coil 152 to the station for talking purposes and signaling battery supply after the dial restores to normal. At that time the party at station A and the P. B. X attendant can talk to the central office through retardation coil 151 which then acts as a repeating coil. While the dial is off normal, resistance 160 is connected across the lower winding of retardation coil 151 for purposes which will appear hereinafter.

While the dial restores to normal the dialing contact makes and breaks the pulsing circuit to the central office free of any series impedance or bridged capacity in the dialing circuit. When the dial restores to normal, it removes the short circuit across the tip and ring conductors of the dial circuit and the upper winding of retardation coil 151 and replaces the short circuit about the winding of relay 52 which relay then releases.

Relay 52 released, removes the resistance 160 from across the lower winding of retardation coil 151. This combination of the dial removing the short circuit from the upper winding of retardation coil 151 and relay 52 removing the resistance 160 from the lower winding of coil 151 prevents a false pulse being transmitted to the central office due to the impedance of the retardation coil being connected in series with the trunk.

Subsequent operation and release of the dial causes subsequent operation and release of relay 52. When the complete code has been sent the attendant may restore the "talk and dial" key if the calling station remains on the connection or the attendant may wait until the called party answers and then ring the calling station in the manner previously described.

The impulses transmitted over the trunk T by the operation of dial 50 control the operation of central office switches in the well-known manner which function to extend the connection to the called line.

When the "talk and dial" key 30 is restored, ground is removed from contacts 55 of the key thus causing the release of relay 130 and the restoration of the attendant's telephone and dial circuit TD to normal condition. Under this condition the talking circuit from the trunk T to the calling line L is over the cord circuit C.

At the termination of conversation on the connection just described the calling party at station A disconnects in the usual manner causing relay 34 to release and open the operating circuit to relay 40. Relay 40, however, is held locked to ground at contacts 164 of key 30 by way of the outer upper armature and back contact of relay 137 and the front contact and innermost armature of relay 40. Thus relay 40 does not release so that the holding bridge including coil 120 and resistance 121 is not reconnected to the cord. The central office equipment therefor will release immediately when station A disconnects. This results in "through" supervision.

When relay 34 releases, lamp 42 is lighted to indicate to the attendant that conversation has been concluded and the connection may be taken down. Plugs 16 and 25 therefore, are removed from jacks 10 and 100 respectively, restoring the circuit to normal.

*Monitoring*

The normal connection of the attendant's induction coil 57 provides maximum efficiency for talking to a station or a central office trunk. This would, however, cause an undesirable loss when the attendant monitors on an established connection due to the bridging loss and room noise picked up by the transmitter 48. The monitoring key 58 opens the transmitter side of the induction coil 57 raising its impedance to a satisfactory value for monitoring and preventing interference from room noise.

*Sleeve protection*

Varistors 199 and 198 associated with relays 29 and 19, respectively, are provided to reduce the potential which would be impressed on the cord sleeve when a plug is removed from a jack. These varistors are of the point contact or dry type. Ordinarily, the current flowing through the varistor when the associated relay is operated is very low (less than 0.1 milliampere). Resistances 197 and 196 are connected in series with the associated varistors to reduce the current flow to a maximum 40 milliamperes in case the battery supply, should, for any reason become reversed.

What is claimed is:

1. In a telephone exchange system, calling and called subscribers' lines each having a station thereon including a switchhook and contacts controlled thereby, a trunk line, means comprising a cord circuit for interconnecting said calling and called lines and for extending a connection from said trunk line to one of said subscribers' lines, a single calling supervisory relay, a single answering supervisory relay, each of said relays in said cord circuit, means whereby said relays are responsive to switchhook operations at the stations of said called and calling lines, respectively, when said cord circuit is used to interconnect said subscribers' lines, a bridge circuit, means controlled by said calling supervisory relay for connecting said bridge circuit across said cord circuit, means including said answering supervisory relay and said calling supervisory relay for causing said calling supervisory relay-controlled means to connect said bridge circuit across said cord circuit, means whereby said answering supervisory relay and said calling supervisory relay are responsive to switchhook operations at a called subscriber's station on a connection extended thereto from said trunk line by way of said cord circuit.

2. In a telephone exchange system, a calling line, a station on said calling line having a switchhook and contacts controlled thereby, a called line, a station on said called line, a trunk line, a cord circuit for interconnecting said calling and called lines and for extending a connection from said trunk line to one of said calling and called lines, a calling supervisory relay in said circuit, means whereby said relay is responsive to switchhook control from a called station on a connection involving said calling and called lines and said cord circuit, an answering supervisory relay in said cord circuit, means whereby said answering supervisory relay is responsive to switchhook control from a calling station on a connection involving said calling and called lines and said cord circuit and responsive to switchhook control from a called one of said stations on a connection extended thereto from said trunk line by way of said cord circuit, means controlled by said answering supervisory relay on the latter type connection for operating said calling supervisory relay in a local circuit, a bridge circuit, and means controlled by said calling supervisory relay for controlling the connection of said bridge circuit to said cord circuit.

3. In a telephone exchange system, a calling subscriber's line, a station on said calling line, a called subscriber's line having a switchhook and contacts controlled thereby, a station on said called line, a trunk line, a cord circuit for interconnecting said calling and called lines and for extending inward and outward connections between said trunk line and any of said subscribers' lines, a calling supervisory relay in said cord circuit, means whereby said calling supervisory relay is responsive to switchhook control from a called station on a connection involving said calling and called lines and said cord circuit, an answering supervisory relay in said cord circuit means whereby said answering supervisory relay is responsive to switchhook control from a calling station on a connection involving said calling and called lines and said cord circuit and means whereby said answering supervisory relay is responsive to switchhook control from certain of said stations on inward and outward connections involving said subscribers' lines, said trunk line and said cord, means controlled by said answering supervisory relay on connections involving said trunk line for operating said calling supervisory relay in a local circuit, means for completing a locking circuit for said calling supervisory relay, means whereby said completing means is effective only on outward connections completed over said cord circuit, a bridge circuit, and means controlled by said calling supervisory relay for controlling the connection of said bridge circuit to said cord circuit.

4. In a telephone exchange system, local station lines and trunk lines, a cord for completing telephone connections between said lines and comprising a trunk jack and a station jack, an attendant's telephone circuit, a key in said cord having normally closed contacts which render said cord continuous and which, when said key is operated, function to split said cord, alternate contacts controlled by said key, when operated, to connect said attendant's telephone circuit across both said trunk jack and said station jack, a holding bridge, a key in said attendant's telephone circuit, and electromagnetically operated means, means whereby said electromagnetically operated means is controlled by said second key while said first key is operated for disconnecting said attendant's telephone circuit from the trunk jack of said cord and connecting said holding bridge thereto.

5. In a telephone exchange system, local station lines and trunk lines, a cord for completing telephone connections between said lines and comprising a trunk jack and a station jack, an attendant's telephone circuit, a key in said cord having normally closed contacts which render said cod continuous and which, when operated, function means whereby said key splits said cord, alternate contacts, means whereby said contacts are controlled by said key when operated to connect said attendant's telephone circuit across both said trunk jack and said station jack, a two-winding retard coil, a key in said attendant's telephone circuit, a relay, an operating circuit for said relay, means for completing said operating circuit incident to joint operation of both said keys, contacts, means whereby said contacts are controlled by said relay for disconnecting said attendant's telephone circuit from the trunk jack of said cord and connecting a bridge circuit thereto which includes closed contacts of said second key, means including said first key for locking said relay operated independent of said second key, and means including contacts of said second key when released for connecting one winding of said retard coil across the trunk jack of said cord and the other winding of said retard coil across said attendant's telephone circuit and for opening the bridge circuit to said trunk jack.

6. In a telephone exchange system, a line circuit, a trunk circuit, means for interconnecting said circuits comprising a cord circuit, an operator's telephone and dial circuit, a key in said cord circuit, contacts, means whereby said contacts are controlled by said key and adapted to connect said telephone and dial circuit with said cord circuit, a dial in said dial circuit including normally closed off-normal contacts, a relay normally shunted by the off-normal contacts of said dial. means including contacts of said key, means whereby said contacts are effective incident to the operation of said key for completing an energizing circuit to said telephone by way of the closed off-normal contacts of said dial whereby said relay is rendered operative incident to the movement of said dial from normal position and the consequent opening of its normally closed off-normal contacts, and means controlled by said relay, when operated, for short-circuiting the receiver of said telephone and for connecting a bridge across one end of said cord.

7. In a telephone exchange system, a cord circuit for completing telephone connections, an operator's telephone and dial circuit, a key in said cord circuit, contact means controlled by said key adapted to connect said telephone and dial circuit with said cord circuit, a dial in said dial circuit including normally closed off-normal contacts, a relay normally shunted by the off-normal contacts of said dial, means for completing an energizing circuit to the transmitter of said telephone by way of the off-normal contacts of said dial, means whereby said means is effective incident to the operation of said key, means whereby said relay is rendered operative incident to the movement of said dial from normal position and the consequent separation of its normally closed off-normal contacts, and means controlled by said relay, when operated, for short-circuiting the receiver of said telephone.

8. A cord circuit for interconnecting subscribers' lines and trunk circuits and including a trunk cord and a station cord, a plug terminating each cord and each including a sleeve contact, a sleeve relay having its winding interposed between battery and the sleeve contact of the station plug, means whereby an energizing circuit for said sleeve relay is completed when said station cord plug is inserted in a jack having the sleeve terminal thereof at ground potential, a trunk relay interposed between ground potential and the sleeve contact of the trunk plug, means whereby an energizing circuit for said trunk relay is completed when said trunk cord plug is inserted in a jack having the sleeve terminal thereof at battery potential, and means for reducing the voltage impressed on the sleeves of said trunk and station plugs incident to the withdrawal of the plugs from such jacks comprising a series circuit including a dry rectifier and a current limiting resistor connected in shunt with the winding of each of said trunk and sleeve relays.

LANGFORD J. BOWNE.

REFERENCES CITED

The following references are of record in the file of this patent:

UNITED STATES PATENTS

| Number | Name | Date |
|---|---|---|
| 1,718,301 | Nelson | June 25, 1929 |
| 2,069,038 | Labaugh | Jan. 26, 1937 |
| 2,139,249 | Welch | Dec. 6, 1938 |
| 2,273,530 | King | Feb. 17, 1942 |
| 2,305,939 | Wallace | Dec. 22, 1942 |
| 2,407,241 | Bascom | Sept. 10, 1946 |